United States Patent
Santamarina et al.

(10) Patent No.: US 9,333,564 B2
(45) Date of Patent: May 10, 2016

(54) DRILL BIT

(71) Applicant: BLACK & DECKER INC., Newark, DE (US)

(72) Inventors: Aland Santamarina, Columbia, MD (US); Glen V. Steinbrunner, Bel Air, MD (US); David N. Johnson, Doncaster (GB)

(73) Assignee: BLACK & DECKER INC., New Britain, CT (US)

( * ) Notice: Subject to any disclaimer, the term of this patent is extended or adjusted under 35 U.S.C. 154(b) by 10 days.

(21) Appl. No.: 14/462,935

(22) Filed: Aug. 19, 2014

(65) Prior Publication Data

US 2014/0356088 A1  Dec. 4, 2014

Related U.S. Application Data

(63) Continuation-in-part of application No. 14/205,577, filed on Mar. 12, 2014, and a continuation-in-part of application No. 29/449,538, filed on Mar. 15, 2013, now Pat. No. Des. 737,875, and a continuation-in-part (Continued)

(51) Int. Cl.
*B23B 51/02* (2006.01)
*B23P 15/32* (2006.01)

(52) U.S. Cl.
CPC .............. *B23B 51/02* (2013.01); *B23B 2240/16* (2013.01); *B23B 2251/043* (2013.01); *B23B 2251/18* (2013.01); *B23B 2251/404* (2013.01); *B23B 2251/60* (2013.01); *B23P 15/32* (2013.01);

(Continued)

(58) Field of Classification Search
CPC ............ B23B 2251/60; B23B 2240/00; B23B 2240/08; B23B 2240/16; B23B 51/02; Y10T 408/78; Y10T 408/905; Y10T 408/906; Y10T 408/909; Y10T 408/9093
USPC .......................... 408/144, 223, 224, 227, 228
See application file for complete search history.

(56) References Cited

U.S. PATENT DOCUMENTS

| 460,639 A | 10/1891 | Holt |
| 542,223 A | 7/1895 | Johnson |

(Continued)

FOREIGN PATENT DOCUMENTS

| CH | 675842 A5 | 11/1990 |
| CN | 1018422202 A | 9/2010 |

(Continued)

OTHER PUBLICATIONS

"High Speed Steels (HSS) Hardness Tables" http://www.tool-tool.com/hss.htm.*

(Continued)

*Primary Examiner* — Daniel Howell
*Assistant Examiner* — Yasir Diab
(74) *Attorney, Agent, or Firm* — Scott B. Markow

(57) ABSTRACT

An elongated drill bit has a shank at one end and working end at the other. A flute portion is between the working end and the shank. The flute portion is continuous with the shank and working end and is generally unitarily formed with them. The flute portion has at least one flute with a helix angle between approximately 30° and 35°. The working end has a pilot tip with a cutting portion. A tapered web is formed in the flute portion, a thickness of the web at the tip of the working end is about 9% to 15% of the nominal diameter.

18 Claims, 7 Drawing Sheets

Related U.S. Application Data of application No. 29/468,347, filed on Sep. 30, 2013, now Pat. No. Des. 734,792.

(60) Provisional application No. 61/871,446, filed on Aug. 29, 2013, provisional application No. 61/860,987, filed on Aug. 1, 2013.

(52) U.S. Cl.
CPC ............ *Y10T408/78* (2015.01); *Y10T 408/905* (2015.01); *Y10T 408/906* (2015.01); *Y10T 408/909* (2015.01); *Y10T 408/9065* (2015.01); *Y10T 408/9093* (2015.01); *Y10T 408/9097* (2015.01)

(56) References Cited

U.S. PATENT DOCUMENTS

| | | | |
|---|---|---|---|
| 1,350,241 | A | 8/1920 | Routh |
| 1,398,156 | A | 11/1921 | Schroeder |
| 1,499,584 | A | 7/1924 | Litchfield |
| 1,570,650 | A | 1/1926 | Thomson |
| 1,887,372 | A | 11/1931 | Emmons |
| RE18,182 | E | 5/1934 | Emmons |
| D92,385 | S | 6/1934 | Bardwell |
| 1,984,839 | A | 12/1934 | Murray |
| 2,101,347 | A | 12/1937 | Robinette |
| 2,193,186 | A | 3/1940 | Bannister |
| 2,302,069 | A | 11/1942 | Stephens |
| 2,332,295 | A | 10/1943 | Bouchal |
| D137,744 | S | 4/1944 | Gunderson |
| 2,652,083 | A | 9/1953 | Emmons |
| 2,708,853 | A | 5/1955 | MacLean |
| 2,740,974 | A | 4/1956 | Lewis |
| 2,769,355 | A | 11/1956 | Crisp |
| 2,936,658 | A | 5/1960 | Riley |
| 3,027,953 | A | 4/1962 | Coski |
| 3,085,453 | A | 4/1963 | Mossberg |
| 3,387,511 | A | 6/1968 | Ackart, Sr. et al. |
| 3,476,438 | A | 11/1969 | Bower, Jr. |
| 3,559,513 | A | 2/1971 | Hougen |
| 3,592,555 | A | 7/1971 | Mackey, Sr. |
| 3,609,056 | A | 9/1971 | Hougen |
| 3,648,508 | A | 3/1972 | Hougen |
| 3,655,244 | A | 4/1972 | Swisher |
| 3,746,396 | A | 7/1973 | Radd |
| 3,779,664 | A | 12/1973 | Caley et al. |
| 3,825,362 | A | 7/1974 | Hougen |
| 4,144,868 | A | 3/1979 | Heitbrink |
| 4,210,215 | A | 7/1980 | Peetz et al. |
| D257,511 | S | 11/1980 | Zahn |
| 4,265,574 | A | 5/1981 | Eckle |
| 4,340,327 | A | 7/1982 | Martins |
| 4,383,784 | A | 5/1983 | Gulbrandsen |
| D269,495 | S | 6/1983 | Finn |
| 4,529,341 | A | 7/1985 | Greene |
| 4,556,347 | A | 12/1985 | Barish |
| 4,605,347 | A | 8/1986 | Jodock et al. |
| 4,711,609 | A | 12/1987 | Seefluth |
| 4,756,650 | A | 7/1988 | Wakihira et al. |
| 4,762,445 | A | 8/1988 | Bunting et al. |
| 4,826,368 | A | 5/1989 | Tikal et al. |
| 4,878,788 | A | 11/1989 | Wakihira et al. |
| 4,880,707 | A | 11/1989 | Kohno et al. |
| 4,898,503 | A | 2/1990 | Barish |
| 4,926,558 | A | 5/1990 | Brace |
| 4,967,855 | A | 11/1990 | Moser |
| 4,968,193 | A | 11/1990 | Chaconas et al. |
| 4,983,079 | A | 1/1991 | Imanaga et al. |
| 5,011,342 | A | 4/1991 | Hsu |
| 5,056,967 | A | 10/1991 | Hageman |
| 5,088,863 | A | 2/1992 | Imanaga et al. |
| 5,152,642 | A | 10/1992 | Pitts et al. |
| 5,230,593 | A | 7/1993 | Imanaga et al. |
| 5,288,183 | A | 2/1994 | Chaconas et al. |
| D346,103 | S | 4/1994 | Warner |
| 5,350,261 | A | 9/1994 | Takaya et al. |
| 5,442,979 | A | 8/1995 | Hsu |
| 5,580,196 | A | 12/1996 | Thompson et al. |
| 5,934,845 | A | 8/1999 | Frey |
| 5,947,660 | A | 9/1999 | Karlsson et al. |
| 6,007,279 | A | 12/1999 | Malone, Jr. |
| D419,575 | S | 1/2000 | Kouvells |
| 6,045,302 | A | 4/2000 | Orr |
| 6,050,754 | A | 4/2000 | Thomas |
| 6,089,337 | A | 7/2000 | Kleine et al. |
| 6,102,634 | A | 8/2000 | Turner et al. |
| 6,113,321 | A | 9/2000 | Mulroy et al. |
| 6,190,097 | B1 | 2/2001 | Thomas |
| 6,227,774 | B1 | 5/2001 | Haughton et al. |
| 6,309,149 | B1 | 10/2001 | Borschert et al. |
| 6,312,432 | B1 | 11/2001 | Leppelmeier |
| 6,443,674 | B1 | 9/2002 | Jaconi |
| 6,511,268 | B1 | 1/2003 | Vasudeva et al. |
| 6,637,987 | B2 | 10/2003 | Lui et al. |
| D482,252 | S | 11/2003 | Hyde |
| 6,652,203 | B1 | 11/2003 | Risen, Jr. |
| 6,705,807 | B1 | 3/2004 | Rudolph et al. |
| 6,739,872 | B1 | 5/2004 | Turri |
| 6,851,898 | B2 | 2/2005 | Ege et al. |
| 6,857,832 | B2 | 2/2005 | Nygard |
| 6,981,496 | B2 | 1/2006 | Szendrovari et al. |
| D525,840 | S | 8/2006 | Bruce |
| 7,178,878 | B2 | 2/2007 | Rompel |
| 7,241,085 | B2 | 7/2007 | Frisendahl |
| 7,258,513 | B2 | 8/2007 | Gertner |
| 7,267,514 | B2 | 9/2007 | Wetzl et al. |
| 7,363,922 | B2 | 4/2008 | Lang et al. |
| 7,398,840 | B2 | 7/2008 | Ladi et al. |
| 7,520,703 | B2 * | 4/2009 | Rompel ............ B23B 51/02 408/225 |
| D594,306 | S | 6/2009 | Decker |
| 7,578,726 | B2 | 8/2009 | Gasser |
| 7,784,381 | B2 | 8/2010 | Ladi et al. |
| 7,784,567 | B2 | 8/2010 | Choe et al. |
| 7,802,495 | B2 | 9/2010 | Oxford et al. |
| 7,851,067 | B2 | 12/2010 | Caliskanoglu et al. |
| 7,900,719 | B2 | 3/2011 | Yao |
| 7,913,779 | B2 | 3/2011 | Choe et al. |
| D637,629 | S | 5/2011 | Clark |
| D648,356 | S | 11/2011 | Clark |
| 8,168,009 | B2 | 5/2012 | Mesquita et al. |
| 8,201,648 | B2 | 6/2012 | Choe et al. |
| D664,167 | S | 7/2012 | Lampe |
| 8,230,762 | B2 | 7/2012 | Choe et al. |
| 8,449,041 | B2 | 5/2013 | Monyak et al. |
| D687,871 | S | 8/2013 | Liao et al. |
| 8,740,515 | B2 | 6/2014 | Thomas et al. |
| 2002/0046885 | A1 | 4/2002 | Eichhorn |
| 2002/0160235 | A1 | 10/2002 | Caminiti |
| 2003/0017015 | A1 | 1/2003 | Strubler |
| 2003/0202853 | A1 | 10/2003 | Ko et al. |
| 2003/0215297 | A1 | 11/2003 | Frisendahl |
| 2004/0052595 | A1 | 3/2004 | Dembicks et al. |
| 2004/0191015 | A1 | 9/2004 | Kozak |
| 2004/0253379 | A1 | 12/2004 | Sugita et al. |
| 2005/0053438 | A1 | 3/2005 | Wetzl et al. |
| 2005/0098358 | A1 | 5/2005 | Nadler |
| 2005/0126829 | A1 | 6/2005 | Meierhofer et al. |
| 2005/0271890 | A1 | 12/2005 | Koecher |
| 2006/0056930 | A1 | 3/2006 | Rompel |
| 2007/0062046 | A1 | 3/2007 | Hsu |
| 2008/0056835 | A1 | 3/2008 | Astrand et al. |
| 2008/0166194 | A1 | 7/2008 | Durfee |
| 2008/0189957 | A1 | 8/2008 | Kasper |
| 2009/0133785 | A1 | 5/2009 | Ayada et al. |
| 2009/0283334 | A1 | 11/2009 | Durairajan et al. |
| 2009/0320299 | A1 | 12/2009 | Kuhn et al. |
| 2010/0003094 | A1 | 1/2010 | Durfee |
| 2010/0054881 | A1 * | 3/2010 | Thomas ............ B23B 51/02 408/1 BD |
| 2010/0135741 | A1 | 6/2010 | Probst et al. |
| 2010/0183391 | A1 | 7/2010 | Kersten |
| 2010/0192475 | A1 | 8/2010 | Stevens et al. |
| 2010/0193255 | A1 | 8/2010 | Stevens et al. |

(56) References Cited

U.S. PATENT DOCUMENTS

| | | |
|---|---|---|
| 2010/0232898 A1 | 9/2010 | Friedrichs |
| 2010/0276205 A1 | 11/2010 | Oxford et al. |
| 2011/0142707 A1 | 6/2011 | Choe et al. |
| 2011/0168453 A1 | 7/2011 | Kersten et al. |
| 2011/0186261 A1 | 8/2011 | Choe et al. |
| 2012/0003057 A1 | 1/2012 | Leyba |
| 2012/0301238 A1 | 11/2012 | Quinn et al. |
| 2013/0209183 A1 | 8/2013 | Chuo et al. |
| 2014/0126972 A1 | 5/2014 | Santamarina et al. |
| 2014/0219737 A1 | 8/2014 | Takai et al. |

FOREIGN PATENT DOCUMENTS

| | | |
|---|---|---|
| DE | 216607 | 11/1908 |
| DE | 7335696 U | 10/1973 |
| DE | 2358048 A1 | 5/1975 |
| DE | 2629130 A1 | 1/1978 |
| DE | 2946103 A1 | 5/1981 |
| DE | 8536123 U1 | 4/1987 |
| DE | 3927615 A1 | 2/1991 |
| DE | 4117486 A1 | 12/1992 |
| DE | 19807609 A1 | 6/1999 |
| DE | 20005730 U1 | 10/2000 |
| DE | 20203232 U1 | 5/2002 |
| DE | 10130681 A1 | 1/2003 |
| DE | 20209797 U1 | 11/2003 |
| DE | 20211589 U1 | 1/2004 |
| DE | 102006049096 A1 | 4/2008 |
| EP | 249104 A1 | 12/1987 |
| EP | 455420 A2 | 11/1991 |
| EP | 522202 B1 | 3/1995 |
| EP | 1238732 A1 | 9/2002 |
| EP | 1260296 A1 | 11/2002 |
| EP | 1016480 B1 | 9/2004 |
| EP | 2058073 A1 | 5/2009 |
| FR | 2829715 A1 | 3/2003 |
| GB | 699716 | 11/1953 |
| GB | 1360221 A | 7/1974 |
| GB | 2193913 A | 2/1988 |
| JP | 61226209 | 10/1986 |
| JP | 62188614 | 8/1987 |
| JP | 1140908 A2 | 6/1989 |
| JP | 4244311 A2 | 9/1992 |
| JP | 9225720 A2 | 9/1997 |
| JP | 2001105216 A2 | 4/2001 |
| JP | 2003225819 A | 8/2003 |
| JP | 3184707 U1 | 7/2013 |
| SU | 844160 A1 | 7/1981 |
| SU | 1238905 A1 | 6/1986 |
| WO | 2004037472 A1 | 5/2004 |
| WO | 2004011179 A1 | 2/2005 |

OTHER PUBLICATIONS

Twist Drills Standard (ASME B94:11-M-1993)—The American Society of Mechanical Engineers—pp. 1-3, 7-33, 48-49, 56-59—Mar. 31, 1994.

National Aerospace Standard (NAS-907)—Aerospace Industries Association of America, Inc.—pp. 1-25—1986.

Black & Decker 1983-84 Consumer Trade Catalog—p. 28—1983.

Introduction to Mechanics of Solids—POPOV, Egor P.—"Design of Nonprismatic Beams"—pp. 360-362—1968.

Rilliard, Arnaud—European Search Report re: European Patent Application No. 14182342—Jan. 28, 2015—10 pages—The Hague.

The State Intellectual Property Office of People's Republic of China—Office Action re: related Patent Application No. 201510109942.8—Dec. 16, 2015—10 pages.

The State Intellectual Property Office of People's Republic of China—Machine Translation of Office Action re: related Patent Application No. 201510109942.8—Dec. 16, 2015—10 pages.

* cited by examiner

DRILL BIT

RELATED APPLICATIONS

This application claims priority, under 35 U.S.C. §119(e), to U.S. Provisional Patent Application No. 61/871,446, filed on Aug. 29, 2013, titled "Self-Centering Drill Bit." This application is also a continuation-in-part of U.S. patent application Ser. No. 14/205,577, filed Mar. 12, 2014, titled "Bi-Metal Drill Bit," which claims the benefit of U.S. Provisional Application No. 61/860,987, filed on Aug. 1, 2013, and is a Continuation-in-Part of U.S. Design Patent Application No. 29/449,538, filed on Mar. 15, 2013 and a Continuation-in-Part of U.S. Design Pat. Application No. 29/468,347, filed on Sep. 30, 2013. The entire disclosures of the above applications are incorporated herein by reference

TECHNICAL FIELD

The present application relates to drill bits and, more particularly, to drill bits including a pilot tip to bore through wood, metal and plastics.

BACKGROUND

One of the most commonly used drill bits to drill through metal is a twist drill formed with a chisel edge at the working end of the drill bit. The chisel edge is formed perpendicular to the axis of the drill bit and usually extends across the small portion of the drill bit diameter. Also, the chisel edge extends equally on opposite sides of the drill bit axis. A cutting edge extends from each opposite end of the chisel edge and tapers axially rearwardly to the outer periphery of the drill bit diameter. In use, the chisel edge is the first portion of the drill bit to engage a workpiece. The chisel edge engages the workpiece and works and extrudes the material in the intermediate vicinity rather than forming chips swarf, sawdust and the like for extraction. A work material enables the drill bit to begin to move into the material of the workpiece whereby the cutting edges begin to cut the material to form removable chips which are discharged via helical flutes running axially rearwardly from the chisel edge and the cutting edges.

While a drill bit with a chisel edge is satisfactory for some drilling operations, it does not provide holes with accurately located centers or round holes. For example, it tends to skip away from the desired location of the hole as a rotating chisel edge engages the workpiece. Further, in the out of round characteristics of the drill bit or tool holder connected to the shank of the drill bit is transmitted to the working end while drilling the hole.

European Patent Publication No. EP0315643 discloses a drill bit having a pilot tip which extends axially ahead of an outer cutting portion. The pilot tip has a smaller diameter than the outer cutting portion. In use, the pilot tip cuts a pilot hole which self-centers the drill bit. Next, the outer cutting portion cuts a main hole in the workpiece which corresponds to the diameter of the drill bit.

A drill bit sold by the Applicant also has a pilot tip which extends axially ahead of an outer cutting portion. The pilot tip has a "split point" cutting edge arrangement to cut the self-centering pilot hole and the outer cutting portion has a pair of major cutting edges arranged on opposite sides of the axis to cut the primary hole. The split point has two inner minor cutting edges arranged on opposite sides of the axis. The two inner minor cutting edges are spaced apart and connected at the extreme tip of the split point by a slight chisel edge. The split point also has an outer minor cutting edge that extends from the end of each inner minor cutting edge and tapers axially rearward to the outer periphery of the pilot tip. In use, the two inner minor cutting edges engage a workpiece to initiate the drilling operation slightly in advance of the engagement of the workpiece by the outer minor cutting edges. The chisel edge does not work or extrude the material in its immediate vicinity, like in the case of the common twist drill mentioned above, because the chisel edge is insignificantly small. The chips created by the inner and the outer minor cutting edges are separate from each other and are therefore smaller in size.

Once the pilot tip begins drilling the self-centering pilot hole, the major cutting edges of the outer cutting portion engage the workpiece and create chips which are also separate from those created by the minor cutting edges of the pilot tip. This arrangement produces smaller chips during the drilling operation which, in turn, reduces resistance to the passage of the drill bit through the workpiece as the drilling process progresses. The drill bit has debris channels in the form of a pair of helical flutes to transport the chips away from the cutting edges and out of the hole being drilled in the workpiece. Smaller chips are naturally easier to convey along the flutes and are less likely to clog up the flutes. A clogged flute creates the problem of significantly increased resistance to the passage of the drill bit through the workpiece. Deeper flutes transport such chips and other debris more easily and are less prone to clogging. However, deeper flutes also result in a thinner web that reduces the strength of the dill bit. A compromise is met by a web that tapers radially outwardly and axially rearward from the pilot tip of the working end towards the drill bit shank. This provides deeper flutes in the region of the working end where efficient debris removal is most important. Also, it provides a thicker web towards the shank where robustness is important. The prior art drill bit has a tapering web with a thickness increasing from the tip portion to the shank portion at a uniform taper rate. See U.S. Pat. Nos. 6,050,754, 6,190,097, 7,267,514 7,520,703, and 8,470,515 each of which is assigned to Applicant, and each of which is incorporated by reference in its entirety.

SUMMARY

In one aspect, this application relates to a drill bit having a thinner web thickness at its tip and a smaller helix angle to improve pull-through, drilling life and efficiency.

According to another aspect, an elongated drill bit with a longitudinal axis and a nominal diameter comprises a shank at one end and a working end is the other end. A flute portion is formed between the shank and the working end. The shank, working end, and flute portion are continuous with one another and are generally unitarily formed. The working end comprises a pilot tip with a cutting portion. The flute portion includes a tapered web that has a web thickness at the working tip of about 7% to 20% of the nominal diameter at the tip of the working end. Also, the flute portion includes a helix angle of from about 30° to 35°.

Implementations of this aspect may include one or more of the following features. A second cutting portion may be formed at a terminus of the flute portion axially spaced from the pilot tip first cutting portion. The second cutting portion may include a pair of cutting edges on opposed sides of the pilot tip.

According to another aspect, an elongated drill bit with a longitudinal axis includes a shank at one end having a nominal diameter, a working end at an opposite end, and a flute portion between the shank and the working end. The shank, the working end and the flute portion re continuous with one another. The flute portion includes a helix angle of approximately 30° to 35°. The working end includes a pilot tip with a first cutting portion and a second cutting portion axially spaced from the first cutting portion. The second cutting portion is at a terminus of the flute portion and includes a pair of cutting edges on opposing sides of the pilot tip. A tapered web is formed in the flute portion. A thickness of the web at the tip of the working end is approximately 9% to 15% of the nominal diameter.

Implementations of this aspect may include one or more of the following features. The drill bit may have: (a) a nominal diameter of ¼ inch or less and the thickness of the web at the tip of the working end is approximately 13% to 15% of the nominal diameter; (b) a nominal diameter between 17/64 inch and 21/64 inch the thickness of the web at the tip of the working end is approximately 11% to 13% of the nominal diameter; or (c) a nominal diameter greater than or equal to 11/32 inch and the thickness of the web at the tip of the working end is approximately 9% to 10% of the nominal diameter. The drill bit may have: (a) a nominal diameter of 17/64 inch or less and the web thickness at the shank is approximately 68% to 76% of the nominal diameter; (b) a nominal diameter between 9/32 inch and 3/8 inch and the web thickness at the shank is approximately 61% to 65% of the nominal diameter; or (c) a nominal diameter 25/64 inch or larger and the web thickness at the shank is about 55% to 60% of the nominal diameter. A thickness of the web at the shank may be approximately 55% to 76% of the nominal diameter of the bit. The web taper rate may be approximately 0.070 to 0.074. The helix angle may be approximately 34.5°.

The working end and at least a portion of the flute portion may formed of a first metal section, and the shank is formed of a second metal section that is welded to the first metal section, the second metal section having a material toughness higher than the first metal section. A length to diameter ratio of the first metal section may be between approximately 0.7 and 3.0. The hardness of the first metal section may be at least approximately 65 HRc. The hardness of the second metal section may be approximately 45-55 HRc. At least one of the first and second metal sections may be heat treated so as to have a recognizable different appearance than the other of the first and second metal sections.

In another aspect, a set of drill bits includes a first drill bit having a first nominal diameter, a second drill bit having a second nominal diameter, and a third drill bit having a third nominal diameter. Each of the drill bits has a shank at a first end, a working end at a second end, and a flute portion between the shank and the working end. The shank, the flute portion and the working end are continuous with one another. The flute portion has flutes with a helix angle of approximately 30° to 35° and a tapered web. The first drill bit has a nominal diameter of 17/64 inch or less and a thickness of the web at the working end of approximately 13% to 15% of the nominal diameter. The second drill bit has a nominal diameter between 17/64 inch and 21/64 inch and a thickness of the web at the working end of approximately 11% to 13% of the nominal diameter. The third drill bit has a nominal diameter greater than or equal to 11/32 inch and a thickness of the web at the working end of approximately 9% to 10% of the nominal diameter.

Implementations of this aspect may include one or more of the following features. The first drill bit may have a web thickness at the shank of approximately 68% to 76% of the nominal diameter. The second drill bit may have a web thickness at the shank is approximately 61% to 65% of the nominal diameter. The third drill bit may have a web thickness at the shank is about 55% to 60% of the nominal diameter. Each of the webs may have a web taper rate of approximately 0.070 to 0.074. Each of the helix angles may be approximately 34.5°. Each of the working ends and at least a portion of each of the flute portions may be formed of a first metal section, and each of the shanks may be formed of a second metal section that is welded to the first metal section, where the first metal section may have a first material hardness that is higher than a second material hardness of the second metal section.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE DRAWINGS

The following description of the drawings is merely exemplary in nature and is in no way intended to limit the invention, its application, or uses.

Figure 1:
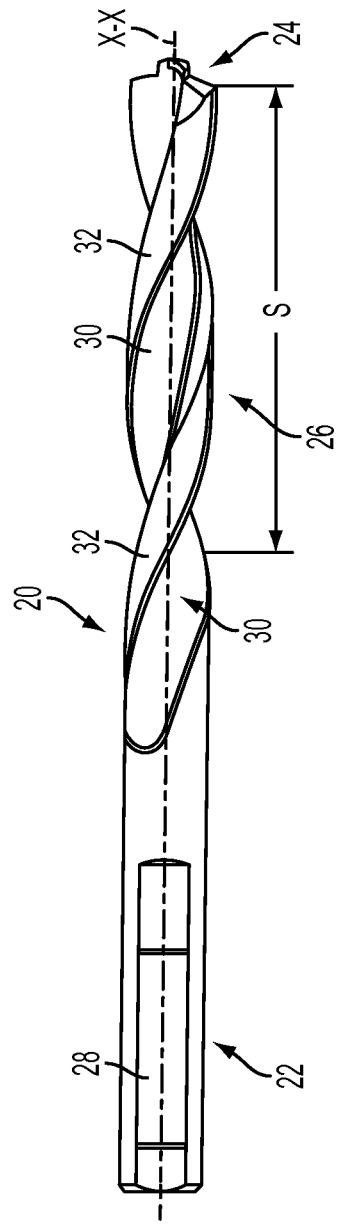
FIG. 1 is an elevation view of a drill bit according to the present invention.
Figure 3:
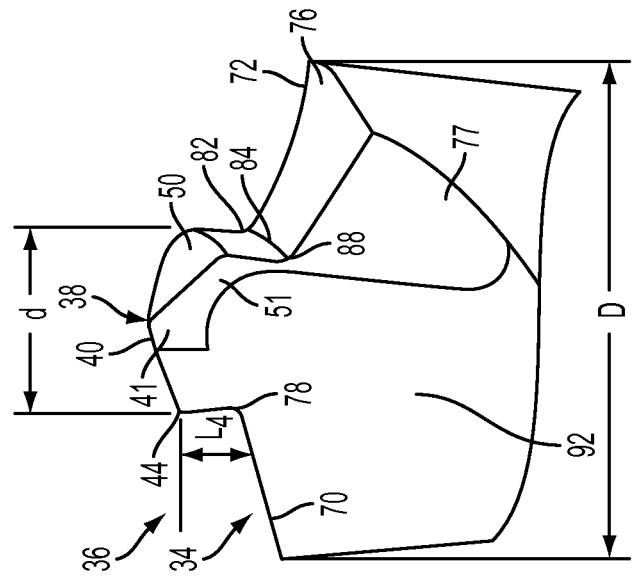
FIG. 3 is an enlarged view of FIG. 2.

Referring to FIG. 1, a drill bit 20 is shown for cutting a variety of material such as metal, wood, plastics, plastics, piping and tubing. The drill bit 20 has a longitudinal axis X-X and may be manufactured from high-speed steel. The drill bit 20 has a shank end 22, a working end 24 and a fluted portion 26 interposed between the shank end 22 and the working end 24. The shank end 22 includes a substantially cylindrical shank 28 that extends from one end of the drill bit 20 to the fluted portion 26. The shank 28 connects to a tool holder (not shown) of a power tool. The shank 28 may have one or a plurality of axially parallel flat chamfers arranged equi-angularly around its circumference to improve the connection with a tool holder of a power tool.

The fluted portion 26 is formed with a pair of helical flutes 30 defined by a pair of helical lands 32 formed at a helix angle $\alpha$ measured with respect to the axis X-X. The helix angle $\alpha$ is between approximately 30° and 35°. In one embodiment, the helix angle may be approximately 34.5°. The helical flutes 30 and the helical lands 32 extend axially rearward from the working end 24 to the shank 28 and each have a pitch S. The pitch S is the linear distance on the drill bit between one full 360° revolution of a helical land. The pitch S is determined by the helix angle $\alpha$ and the major or nominal diameter D of a the fluted portion 26 of the drill bit 20, according to the formula: $S=\pi D/(\tan \alpha)$. For example, in a ½ drill bit, the pitch S may be between approximately 1.87 and 3.36 inches, e.g., between approximately 1.87 and 2.24 inches. In a ½" drill bit where the helix angle α is approximately 34.5°, the pitch is approximately 2.29 inches.

Referring to FIGS. 2 to 5, the working end 24 includes a flute cutting portion 34 having the same major or nominal diameter D, and a pilot tip 36 with a minor diameter d that is smaller than the major or nominal diameter D. The pilot tip 36 is formed integrally with and extends a short distance axially ahead of the flute cutting portion 34. The pilot tip 36 has a split point cutting edge arrangement at its extreme end 38. The cutting edge arrangement is formed with a pair of inner cutting edges 40, 42 separated by a slight chisel edge 38 extending between the inner cutting edges 40, 42. The chisel edge 38 is substantially perpendicular to the axis X-X. The split point is also formed with a pair of outer cutting edges 44, 46. Each outer cutting edge 44, 46 tapers radially outwardly from a respective inner cutting edge 40, 42 to the periphery of the minor diameter d of the pilot tip 36. The split point is also formed with a pair of primary clearance faces 48, 50. Each primary clearance face is formed behind a respective pair of leading inner and outer cutting edges 40, 44, 42, 46 (in the direction of rotation R) to provide relief behind these cutting edges. Each inner cutting edge 40, 42 forms a boundary between a leading rake face 52, 54 and a respective trailing primary clearance face 48, 50 (in the direction of rotation R).

The pilot tip 36 is also formed with a pair of rounded circumferential outer surfaces 56, 58. Each outer surface 56, 58 extend axially rearward on opposite sides of the pilot tip 36. The outer surface 56 is formed with a forward edge 60 and a trailing edge 62 (in the direction of rotation R). The outer surface 58 is formed with a forward edge 64 and a trailing edge 66 (in the direction of rotation R).

Figure 4:
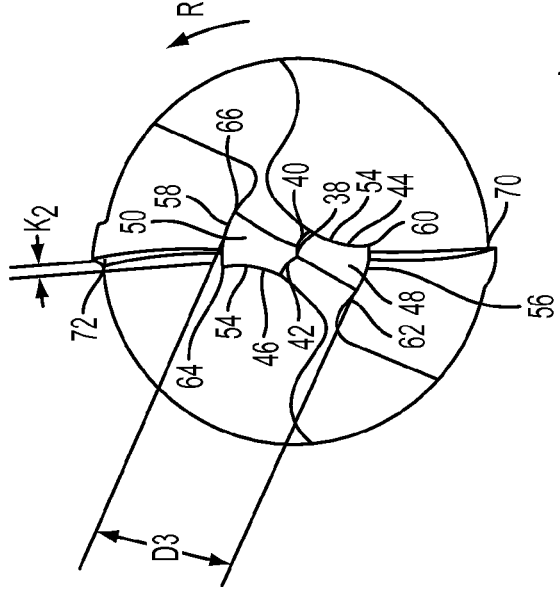
FIG. 4 is a top plan view of the drill bit of FIG. 1.

When viewed from above, as shown in FIG. 4, the outer surfaces 56, 58 are generally rounded but are also curved radially inwardly as the outer surfaces extend from a respective forward edge 60, 64 to a respective trailing edge 62, 66. This is clearly shown in FIG. 7, where the outer surfaces 56, 58 curve radially inwardly of a circle represented by dashed line 68 thereby creating a radial relief RR. Accordingly, the outer surfaces 56, 58 each provide relief behind a respective forward edge 60, 64.

Figure 5:
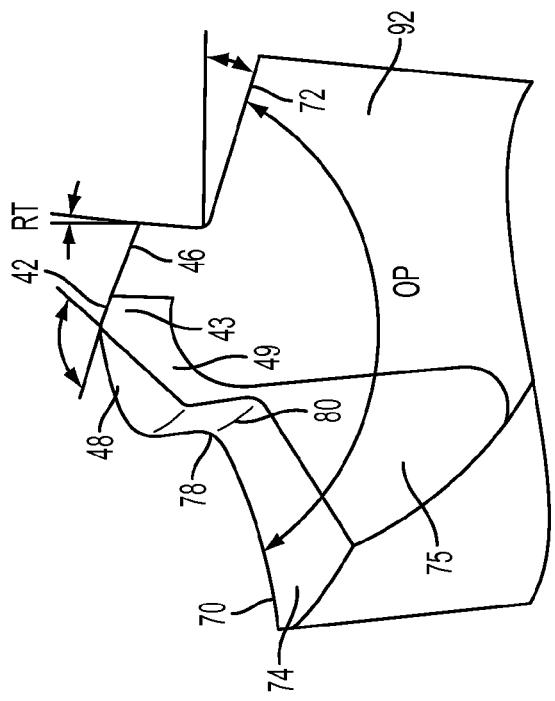
FIG. 5 is an enlarged side elevation view of the tip of FIG. 1.

When viewed from the side, as shown in FIG. 5, the outer surfaces 58, 60 are generally straight but are also slightly tapered radially inwardly as the outer surfaces extend axially rearward. The rearward taper RT of each outer surface 56, 58 are approximately 0.5° to 5° measured from a plane parallel to the axis X-X. Accordingly, the outer surfaces 56, 58 also provide relief behind the pilot tip 36.

Returning to FIGS. 2 to 5, the second cutting portion 34 is formed with a pair of second cutting edges 70, 72 at the terminus of the flute portion 26. Each second cutting edge 70, 72 has a respective trailing primary clearance face 74, 76 (in the direction of rotation R). Also, secondary clearance faces 75, 77 are continuous with the primary clearance faces 74, 76. The secondary clearance faces 75, 77 are angled with respect to the primary clearance faces 74, 76. The secondary clearance faces are on an angle from about 50° to about 65° with respect to the longitudinal axis. The secondary clearance faces 75, 77 are co-planar with the secondary clearance faces 49, 51 of the pilot point. Further, the secondary clearance faces 75, 77 are co-planar with the rake faces 41, 43 of the inner cutting edges 40, 42.

Each second cutting edge 70, 72 run radially inwardly in a substantially straight line from the periphery of the major diameter D towards the pilot tip 36. The second cutting edges 70, 72 are substantially on a plane which passes through the longitudinal axis X-X. In the region adjacent the pilot tip 36, the second cutting edge 70 begins to curve towards the working end 24 to form a radius at a forward edge 78 of a fillet 80. The second cutting edge 70 merges with the forward edge 60 of the outer surface 56 at the fillet 80. Likewise, the second cutting edge 72 extends from the periphery of the major diameter D towards the pilot tip 36 and eventually curves in an identical manner into a radius at a forward edge 82 of a fillet 84. The second cutting edge 72 merges with the forward edge 64 of the outer surface 58 at the fillet 84.

Each fillet 80, 84 begins at a respective forward edge 78, 82 with a relatively large radius and extends rearward in a curved path from the respective forward edge 78, 82, wherein the radius becomes progressively smaller until each fillet terminates in an approximately right-angle shaped corner 86, 88, respectively. In addition, each fillet 80, 84 extends radially inward from the respective forward edge 78, 82 to a respective trailing corner 86, 88 in the same manner as the rounded outer surfaces 56, 58. Accordingly, the fillets 80, 84 create relief behind the forward edges 78, 82.

As discussed above, relief is provided behind the edges mentioned above. For example, the primary clearance face 74, the secondary clearance face 75 the fillet 80, and the outer surface 56, which trail, the second cutting edge 70, the fillet forward edge 78 and the pilot tip forward edge 60, respectively, create relief behind these edges in the manner described above. Thus, when the drill bit 20 is used to drill a hole in a workpiece, these trailing surfaces do not engage and rub against the walls of the hole. Similarly, the primary clearance face 76, secondary clearance face 77, the fillet 84, and the outer surface 58, which trail, the second cutting edge 72, the fillet forward edge 82 and the pilot tip forward edge 64, respectively, also create relief behind these edges. Thus, when the drill bit 20 is used to drill a hole in a workpiece, these trailing surfaces do not engage and rub against the walls of the hole.

Figure 2:
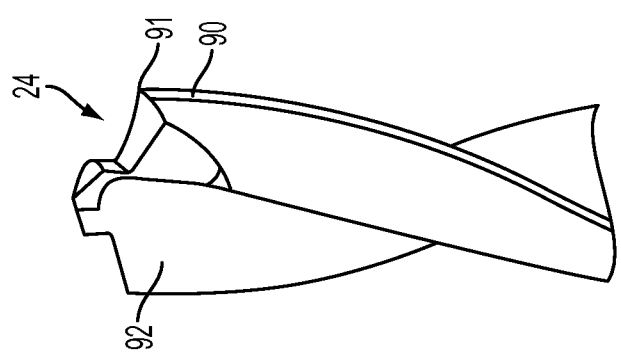
FIG. 2 is a perspective view of a working end of a drill bit of FIG. 1 from one side.

As is shown in FIG. 2, each helical land 32 has a helical margin 90 on a leading edge 91 (in the direction of rotation R) of its circumferential outer face. The margin 90 protrudes radially slightly beyond the circumferential outer face of a respective land 26 and is narrower than the circumferential outer face. The helix defined by each margin 90 defines the major diameter D. The margins 90 engage the walls of the hole to provide support to the drill bit 20 as it drills into a workpiece. Friction between the walls of the hole and the drill bit 20 is thus reduced because the margins 90 have a smaller surface area than the circumferential outer faces of the lands 26.

Figure 6:
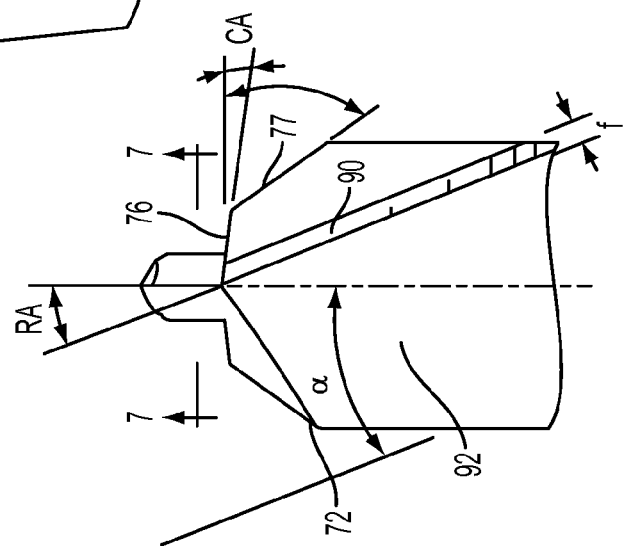
FIG. 6 is an enlarged view of the tip of FIG. 5 rotated 90°.

Referring to FIG. 6, a primary clearance angle CA of each primary clearance face 74, 76 is measured from a plane perpendicular to the axis X-X. The primary clearance angle CA falls within a range of about 8° to about 12° for those drill bits with a major diameter D of less than 8 mm. The primary clearance angle CA falls within a range of about 6° to about 12° for those drill bits with a major diameter D of greater than 8 mm.

Each helical land 32 has an inner surface 92 that defines the shape of a respective flute 34. Each land inner surface 92 extends axially rearward from a respective outer cutting edge 44, 46 and a respective second cutting edge 70, 72. Each outer cutting edge 44, 46 forms a boundary between a respective land inner surface 92 and a respective primary clearance face 48, 50. Likewise, each second cutting edge 70, 72 forms a boundary between a respective land inner surface 92 and a respective primary clearance face 74, 76. The land inner surfaces 92 act as a rake face to both the outer cutting edges 44, 46 and the second cutting edges 70, 72. Accordingly, the land inner surfaces 92 each effectively have a rake face angle RA, as measured from a plane parallel to the axis X-X, that is equal to the helix angle α. The cutting angle of the second cutting edges 70, 74 equals 90°−(RA+CA). The cutting angle of the outer cutting edges 44, 46 equals 90°−(RA+the relief angle of the primary relief face 48, 50).

Referring to FIG. 5, the split point cutting edge arrangement of the pilot tip 36 is formed with a point angle defined by inner cutting edges 40, 42. The pilot point angle PP falls within the range of 125° to 140°. The outer portion is formed with an outer point angle OP defined by the second cutting edges 70, 72 which falls within the range of about 120° to about 140° and preferably about 126° to about 136°. Accordingly, the second cutting edges are on an angle of about 22° to about 27° with respect to a line transverse to the X-X axis. The length L4 of the pilot tip 36 falls within the range of about 30% to about 45% of the major or nominal diameter D.

Figure 7:
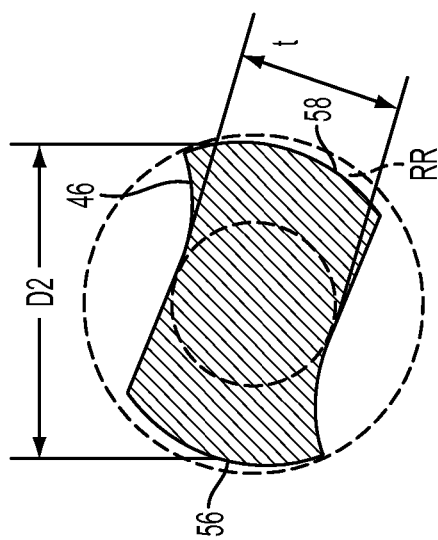
FIG. 7 is a cross-section view through the drill bit of FIG. 6.
Figure 8:
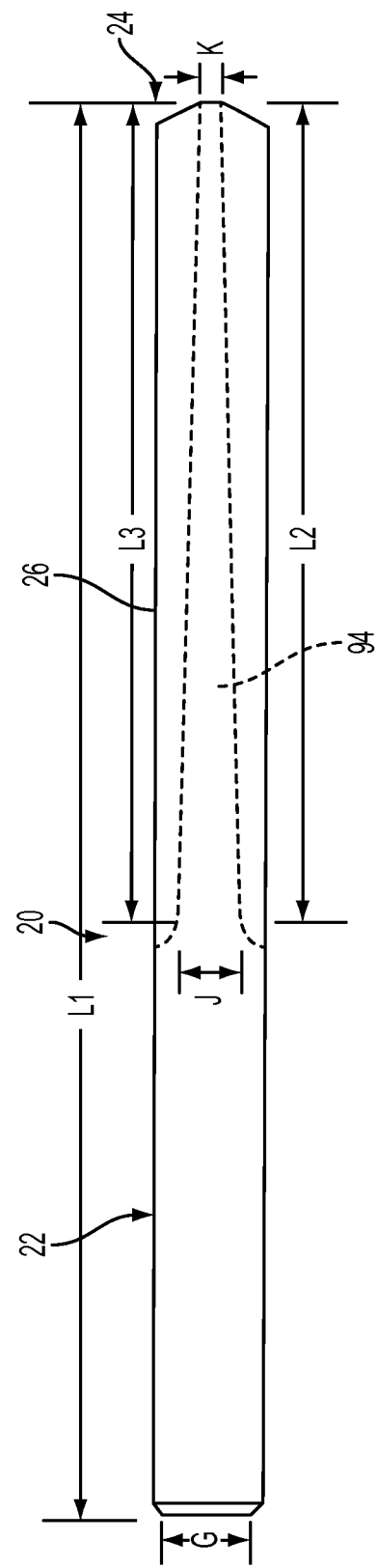
FIG. 8 is a schematic view of the taper of the bit.

Referring to FIGS. 7 and 8, the drill bit 20 has a core, or web, 94 extending from the working end 24 to where the fluted section 26 joins the shank 28. The web 94 is defined by the helical lands 32. The web 94 is shown in dashed lines and tapers radially outwardly as it extends axially rearward from the working end 24. The web 94 has a thickness K at the pilot tip 36 and a thickness J near where the fluted section 26 joins the shank 28. The web 94 has a uniform web thickness taper rate along a length L2 between the pilot tip 36 and the point on the web 94 at which web thickness J is measured. The web thickness K is selected to provide suitably deep flutes 34 to convey, in use, debris and chips from the pilot tip 36 and out of the hole.

The following Table 1 provides examples of embodiments of bits that fall within the scope of the present disclosure:

The web thickness at the shank (J) is about 68% to 76% of the nominal diameter for bits having a nominal diameter of 17/64 inch or less. The web thickness at the shank J is about 61% to 65% of the nominal diameter for bits having a nominal diameter between 9/32 inch and 3/8 inch. The web thickness at the shank J is about 55% to 60% of the nominal diameter for bits having a nominal diameter 25/64 inch or larger. The web taper rate ((J-K)/L3) for all nominal diameters is approximately 0.070 to 0.074. The helix angle for all nominal diameters is approximately 30° to 35°, in particular approximately 34.5°.

Figure 12:
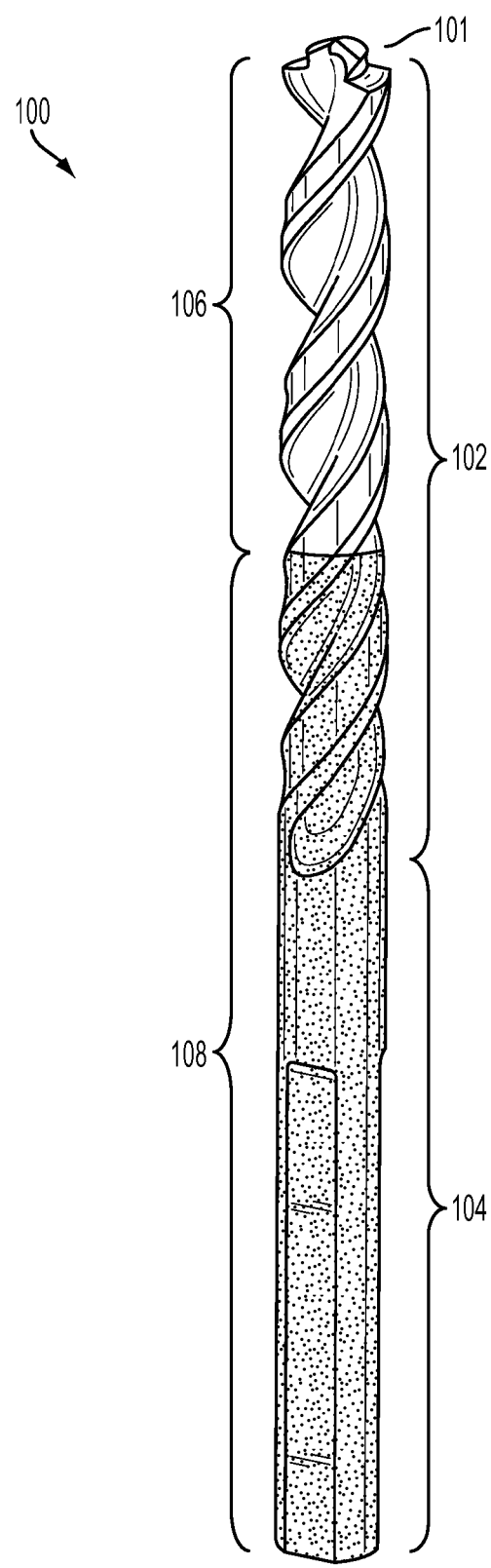
FIG. 12 is a side view of another embodiment of a drill bit.

In an embodiment, the drill bits of the present disclosure may be bi-metal drill bits composed of two different metal materials, similar to the drill bits disclosed in the aforementioned U.S. patent application Ser. No. 14/205,577. Referring to FIG. 12, in this embodiment, the drill bit 100 has a cutting tip 101, a fluted portion 102 and a shank portion 104. The drill bit also has a first portion 106 (encompassing the cutting tip 101 and a front portion of the fluted portion 102) that is formed of a first metal, and a second portion 108 (encompassing a rear portion of the fluted portion and the entire shank portion 104) that is formed of a second metal. The first portion 106 is welded to the second portion 108. The first metal of the first portion 106 has a material hardness that is higher than a second metal of the second portion 108. In certain embodiments, one of the first and second metal portions 106, 108 may be treated either by coating or heat treating so as to have a recognizable different appearance than the other of the first and second metal sections 106, 108. This treatment allows a user to readily recognize that the drill bit is a bi-metal drill bit having improved cutting characteristics due to the hardened

| Diameter | | L1 | L2 | L3 | K | J | (J − K) | S | | | Web | Helix |
|---|---|---|---|---|---|---|---|---|---|---|---|---|
| INCH | mm | (mm) | (mm) | (mm) | (mm) | (mm) | (mm) | (mm) | J/D | K/D | Taper | Angle |
| 3/16 | 4.76 | 90 | 44 | 39 | 0.73 | 3.61 | 2.88 | 21.8 | 0.76 | 0.15 | 0.074 | 34.5 |
| 13/64 | 5.16 | 93 | 47 | 42 | 0.74 | 3.80 | 3.06 | 23.6 | 0.74 | 0.14 | 0.073 | 34.5 |
| 7/32 | 5.56 | 96 | 49 | 43 | 0.76 | 3.92 | 3.16 | 25.4 | 0.71 | 0.14 | 0.073 | 34.5 |
| 15/64 | 5.95 | 100 | 51 | 45 | 0.78 | 4.12 | 3.34 | 27.2 | 0.69 | 0.13 | 0.074 | 34.5 |
| 1/4 | 6.35 | 103 | 55 | 49 | 0.80 | 4.31 | 3.51 | 29.0 | 0.68 | 0.13 | 0.072 | 34.5 |
| 17/64 | 6.75 | 106 | 59 | 52 | 0.82 | 4.56 | 3.74 | 30.9 | 0.68 | 0.12 | 0.072 | 34.5 |
| 9/32 | 7.14 | 109 | 60 | 53 | 0.84 | 4.62 | 3.78 | 32.6 | 0.65 | 0.12 | 0.071 | 34.5 |
| 19/64 | 7.54 | 113 | 62 | 54 | 0.86 | 4.81 | 3.95 | 34.5 | 0.64 | 0.11 | 0.073 | 34.5 |
| 5/16 | 7.94 | 116 | 66 | 58 | 0.87 | 5.06 | 4.19 | 36.3 | 0.64 | 0.11 | 0.072 | 34.5 |
| 21/64 | 8.33 | 119 | 69 | 61 | 0.90 | 5.26 | 4.36 | 38.1 | 0.63 | 0.11 | 0.072 | 34.5 |
| 11/32 | 8.73 | 123 | 72 | 63 | 0.91 | 5.45 | 4.54 | 39.9 | 0.62 | 0.10 | 0.072 | 34.5 |
| 23/64 | 9.13 | 126 | 73 | 64 | 0.94 | 5.64 | 4.70 | 41.7 | 0.62 | 0.10 | 0.074 | 34.5 |
| 3/8 | 9.53 | 129 | 78 | 68 | 0.95 | 5.83 | 4.88 | 43.6 | 0.61 | 0.10 | 0.072 | 34.5 |
| 25/64 | 9.92 | 132 | 80 | 70 | 0.97 | 5.92 | 4.95 | 45.3 | 0.60 | 0.10 | 0.071 | 34.5 |
| 13/32 | 10.3 | 136 | 83 | 72 | 0.99 | 6.18 | 5.19 | 47.2 | 0.60 | 0.10 | 0.072 | 34.5 |
| 27/64 | 10.7 | 139 | 86 | 75 | 1.01 | 6.35 | 5.34 | 49.0 | 0.59 | 0.09 | 0.071 | 34.5 |
| 7/16 | 11.1 | 142 | 89 | 78 | 1.02 | 6.52 | 5.50 | 50.8 | 0.59 | 0.09 | 0.070 | 34.5 |
| 29/64 | 11.5 | 145 | 93 | 81 | 1.05 | 6.75 | 5.70 | 52.6 | 0.59 | 0.09 | 0.070 | 34.5 |
| 15/32 | 11.9 | 149 | 95 | 83 | 1.06 | 6.97 | 5.91 | 54.4 | 0.59 | 0.09 | 0.071 | 34.5 |
| 31/64 | 12.3 | 152 | 97 | 85 | 1.08 | 7.09 | 6.01 | 56.2 | 0.58 | 0.09 | 0.071 | 34.5 |
| 1/2 | 12.7 | 155 | 100 | 87 | 1.10 | 7.29 | 6.19 | 58.1 | 0.57 | 0.09 | 0.071 | 34.5 |

The web thickness at the tip K is about 13% to 15% of the nominal diameter for bits having a nominal diameter of 1/4 inch of less. The web thickness K is about 11% to 13% of the nominal diameter for bits having a nominal diameter between 17/64 inch and 21/64 inch. The web thickness K is about 9% to 10% of the nominal diameter for bits having a nominal diameter greater than or equal to 11/32 inch. This is compared to 22% to 34% (3/64 inch-5/32 inch), 14% to 20% (11/64 inch-19/64 inch), 11% to 14% (5/16 inch-1/2 inch), respectively, of conventional drill bits with nominal diameter sizes. Thus, the web thickness K is about 60% less than the web thickness of conventional drill bits.

cutting portion 101 and front portion of the fluted portion 102, and improved durability due to the tougher metal of the rear portion of the fluted portion 102 and the shank portion 104.

For example, the first metal may be a high-speed steel, e.g., M42 (8% cobalt), M35 (5% cobalt), or M2, with an HRc hardness of at least approximately 65 HRc, for example an HRc in the high 60s. The second metal may be ordinary tool steel, such as 65 Mn steel, with an HRc hardness between approximately 45-55 HRc. The length to diameter ratio of the first metal portion 106 has been optimized to provide good cutting action for sheet-metal having a thickness of 1/4 inch or less. For example, a length to diameter ratio of the first metal section is between approximately 0.7 and 3.0. The lengths of the first metal portion 106 and the second metal portion 108 have been optimized: (1) to allow the first metal section to be able to be held by a welding machine during welding; (2) to allow passage of sufficient current through the first metal section for good electrical resistance welding; (3) to provide better life of the drill bit; (4) to provide better bending toughness in the second metal portion after the first metal section breaks through the sheet-metal; and (5) to minimize the cost of the components of the drill bit.

Figure 9:
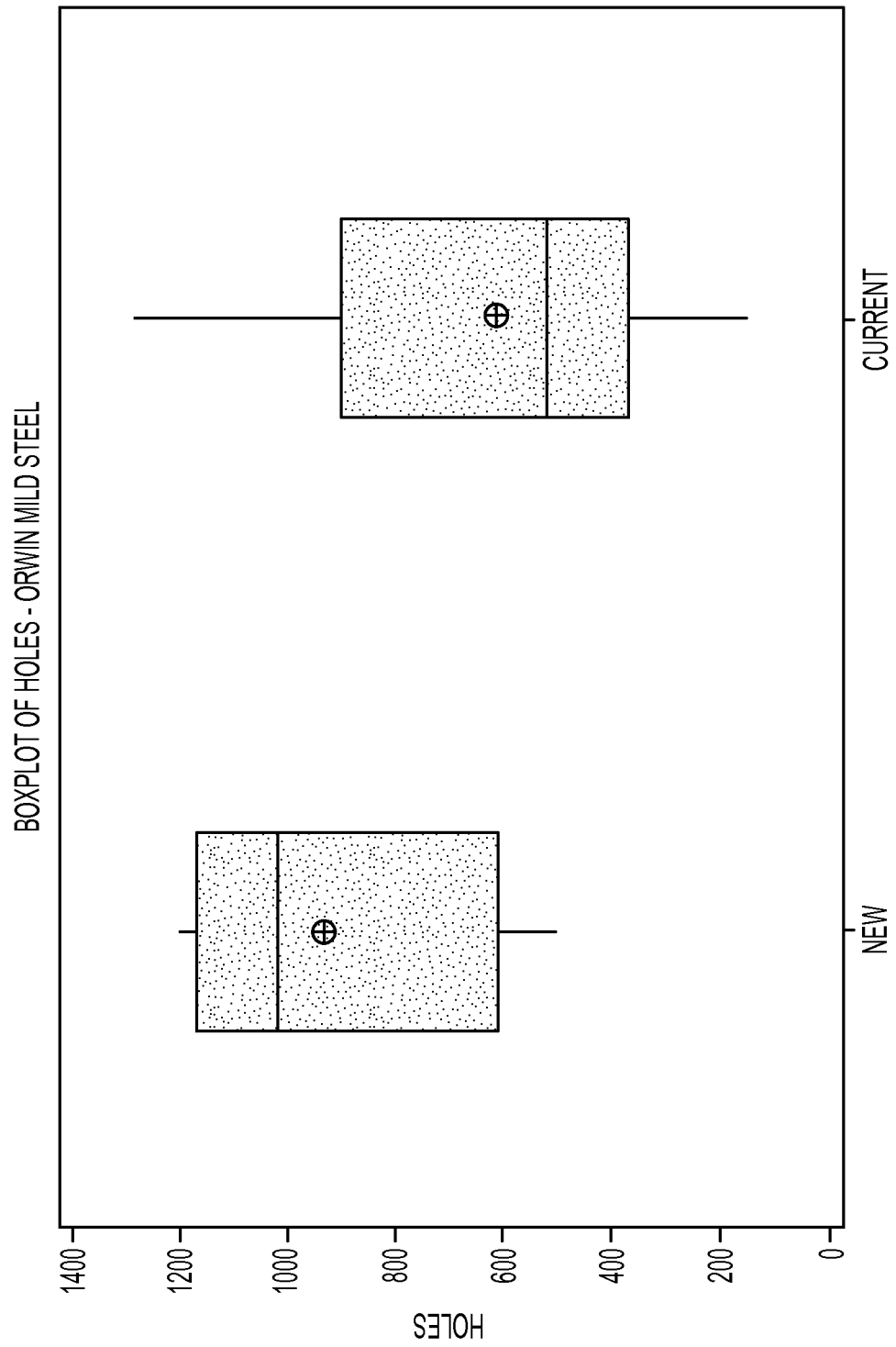
FIGS. 9-11 are schematic charts showing box plots of drilled holes.

The drill bits of the present disclosure dramatically and unexpecrtedly improve drilling life as compared to the prior art design for drill bits, while still preserving acceptable drilling speed. Referring to FIG. 9, in one test, a drill bit having a 6.35 mm nominal diameter (D), a web thickness at the tip (K) of 0.80 mm, a web thickness (J) at the shank of 4.31 mm, a helix length (S) of approximately 29 mm, and a K/D ratio of 0.09 was tested in an Orwin test rig, drilling holes in mild steel. This drill bit was compared against the current conventional drill bit sold by Applicant. The results of this test are illustrated in the box chart shown in FIG. 9. The chart illustrates the number of holes drilled by the present drill bit versus conventional drill bits in mild steel before failure. The present drill bit, on average, drilled approximately 50% more holes prior to failure.

Figure 10:
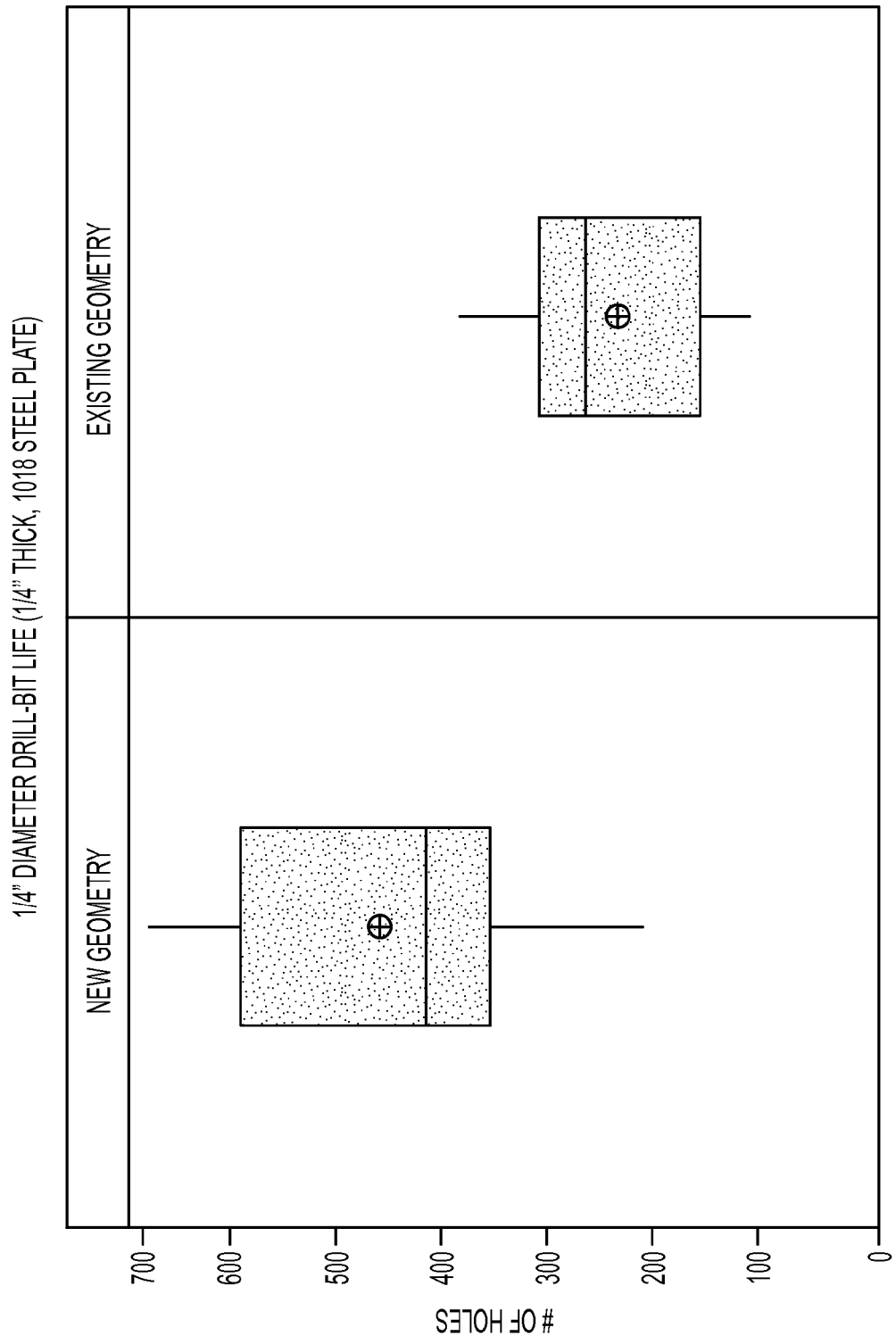

Referring to FIG. 10, another drilling life test was performed using a plurality of the ¼" drill bits having the dimensions set forth in the above Table 1. When a user drills a hole in a workpiece using a hand-held drill, as the drill bit becomes dull, the user will determine that the drill bit is worn out after it does not cut a hole in a reasonable amount of time. Accordingly, the drill bits were life tested using a test rig with a corded drill drilling holes in a ¼-inch thick piece of 1018 mild steel. Acceptable drill times to drill a hole are under approximately 90 seconds per hole. Above approximately 90 seconds, the user believes the drill bit is worn out. Accordingly, the drill bit is said to have reached the end of its life when the drill bit breaks or when the time for drilling the holes exceeds 90 seconds, whichever comes first. On average, the prior art drill bits drilled approximately 252 holes in less than 90 seconds per hole. On average, the drill bits of the present invention drilled approximately 461 holes in less than 90 seconds per hole. This represents an approximately 83% increase in drilling life.

Figure 11:
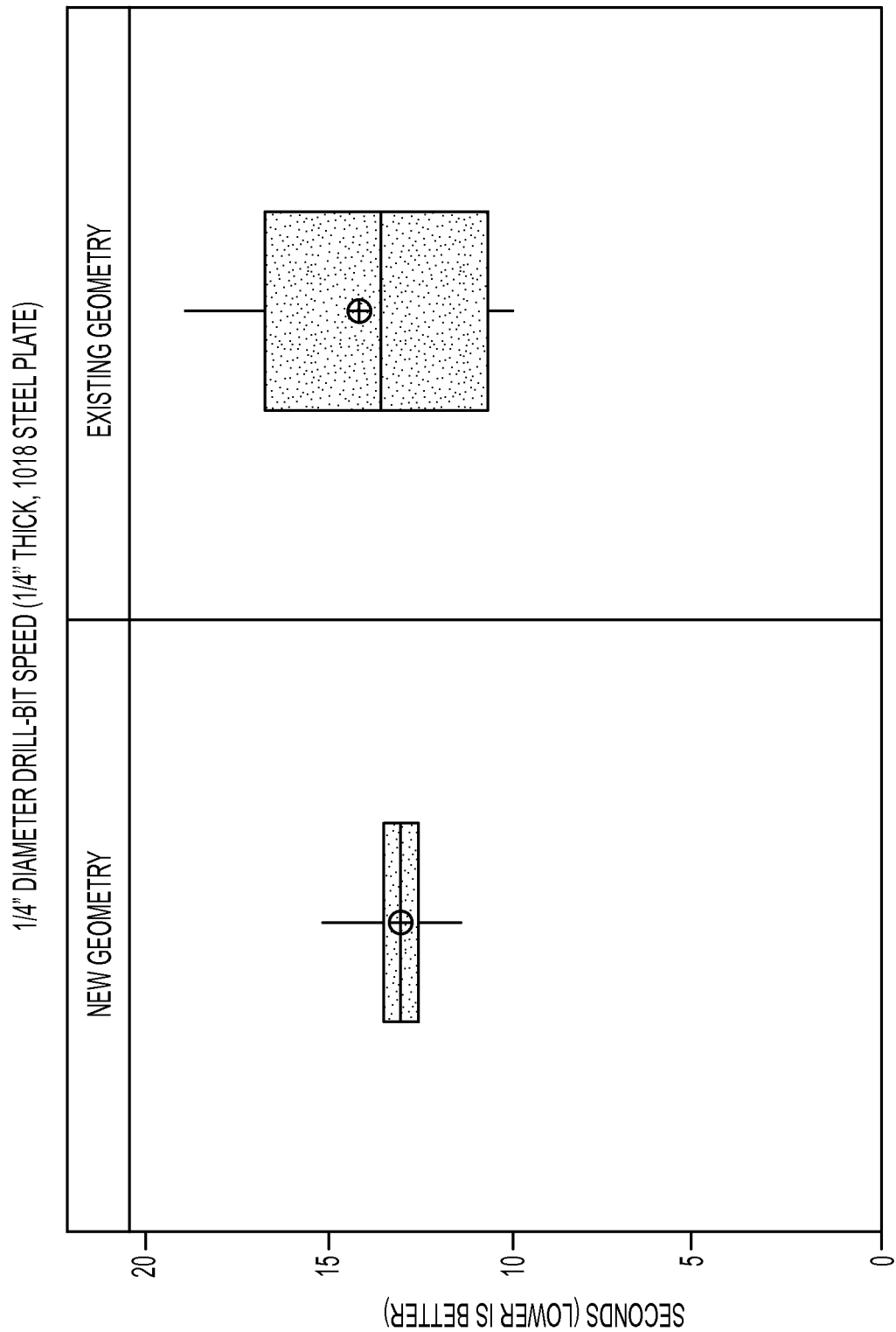

Referring to FIG. 11, the same ¼-inch drill bits were also tested in a drilling speed test using the same test rig as the life test. The drilling speed is determined by the average time for the drill bit to drill each of the first five holes drilled. This test shows that the exemplary drill bits of the present disclosure achieve a speed of approximately 13 seconds, which is virtually the same as the prior art drill bit speed of approximately 14 seconds. Thus, the speed of the drill bits was within the acceptable range of speeds.

It is believed that this dramatic increase in life while maintaining the drilling speed is due to the smaller web thickness (K) at the tip, the smaller helix angle, and the more dramatic web taper rate to a sufficiently large web thickness (J) at the shank, along with the larger helix angle (e.g., approximately 34.5°. In certain embodiments, the bi-metal construction of the bit may further contribute to the improved life.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An elongated drill bit with a longitudinal axis comprising:
   a shank at a first end having a nominal diameter that is between 13/64 inch and ¼ inch, between 17/64 inch and 21/64 inch, or between 11/32 inch and ½ inch;
   a working end at a second end;
   a flute portion between the shank and the working end, with the shank, the working end and the flute portion continuous with one another, the flute portion including at least one flute at a helix angle of approximately 30° to 35°,
   the working end comprises a pilot tip with a first cutting portion and a second cutting portion axially spaced from the first cutting portion, at a terminus of the flute portion, and including a pair of cutting edges on opposing sides of the pilot tip; and
   a tapered web formed in the flute portion, where a thickness of the web at the tip of the working end is between 13% and 14% of the nominal diameter if the nominal diameter is between 13/64 inch and ¼ inch, is between 11% and 12% of the nominal diameter if the nominal diameter is between 17/64 inch and 21/64 inch, or is between 9% and 10% of the nominal diameter if the nominal diameter is between 11/32 inch and ½ inch.

2. The drill bit of claim 1, wherein a thickness of the web at the shank is approximately 55% to 76% of the nominal diameter.

3. The drill bit of claim 2, wherein the drill bit has a nominal diameter of 17/64 inch or less and the web thickness at the shank is approximately 68% to 76% of the nominal diameter.

4. The drill bit of claim 2, wherein the drill bit has a nominal diameter between 9/32 inch and ⅜ inch and the web thickness at the shank is approximately 61% to 65% of the nominal diameter.

5. The drill bit of claim 2, wherein the drill bit has a nominal diameter 25/64 inch or larger and the web thickness at the shank is about 55% to 60% of the nominal diameter.

6. The drill bit of claim 1, wherein the web taper rate is approximately 0.070 to 0.074.

7. The drill bit of claim 1, wherein the helix angle is approximately 34.5°.

8. The drill bit of claim 1, wherein the working end and at least a portion of the flute portion is formed of a first metal section, and the shank is formed of a second metal section that is welded to the first metal section, the second metal section having a hardness that is lower than a hardness of the first metal section.

9. The drill bit of claim 8, wherein a length to diameter ratio of the first metal section is between approximately 0.7 and 3.0.

10. The drill bit of claim 8, wherein the hardness of the first metal section is at least approximately 65 HRc.

11. The drill bit of claim 10, wherein the hardness of the second metal section is approximately 45-55 HRc.

12. The drill bit of claim 8, wherein at least one of the first and second metal sections is heat treated so as to have a recognizable different appearance than the other of the first and second metal sections.

13. A set of drill bits comprising:
   a first drill bit having a first nominal diameter, a second drill bit having a second nominal diameter, and a third drill bit having a third nominal diameter, each of the drill bits having a shank at a first end, a working end at a second end, and a flute portion between the shank and working end, where the shank, the flute portion, and the working end are continuous with one another, and the flute portion has at least one flute with a helix angle of approximately 30° to 35° and a tapered web, wherein the first drill bit has a nominal diameter of 13/64 inch to 1/4 inch and a thickness of the web at the working end of approximately 13% to 14% of the nominal diameter, wherein the second drill bit has a nominal diameter between 17/64 inch and 21/64 inch and a thickness of the web at the working end of approximately 11% to 12% of the nominal diameter, and wherein the third drill bit has a nominal diameter greater than or equal to 11/32 inch and a thickness of the web at the working end of approximately 9% to 10% of the nominal diameter.

14. The set of drill bits of claim 13, wherein the first drill bit has a web thickness at the shank of approximately 68% to 76% of the nominal diameter, the second drill bit has a web thickness at the shank is approximately 61% to 65% of the nominal diameter, and the third drill bit has a web thickness at the shank is about 55% to 60% of the nominal diameter.

15. The set of drill bits of claim 13, wherein the web of each drill bit has a web taper rate of approximately 0.070 to 0.074.

16. The set of drill bits of claim 13, wherein the helix angle of each drill bit is approximately 34.5°.

17. The set of drill bits of claim 13, wherein at least one of the drill bits has the working end and at least a portion of the flute portion formed of a first metal section, and has the shank formed of a second metal section that is welded to the first metal section, the first metal section having a first material hardness that is higher than a second material hardness of the second metal section.

18. An elongated drill bit with a longitudinal axis comprising:

a shank at a first end having a nominal diameter that is between 17/64 inch and 21/64 inch or that is 11/32 inch or greater;

a working end having a cutting portion at a second end;

a flute portion between the shank and the working end, with the shank, the working end and the flute portion continuous with one another, the flute portion including at least one flute at a helix angle of approximately 30° to 35°; and a tapered web formed in the flute portion, where a thickness of the web at the working end is between 11% and 12% of the nominal diameter if the nominal diameter is between 17/64 inch and 21/64 inch, or is between 9% and 10% of the nominal diameter if the nominal diameter is 11/32 inch or greater, wherein the working end and at least a portion of the flute portion is formed of a first metal section, and the shank is formed of a second metal section that is resistance welded to the first metal section, the second metal section having a second hardness that is lower than a first hardness of the first metal section.

* * * * *